(12) United States Patent
Werner et al.

(10) Patent No.: US 7,958,092 B2
(45) Date of Patent: Jun. 7, 2011

(54) MAINTAINING DATA CONSISTENCY BETWEEN INTEGRATED APPLICATIONS

(75) Inventors: Thomas Werner, Baden (CH); Claus Vetter, Buchs (CH); Lorenzo Gulli, Espoo (FI); Erik Svensson, Zürich (CH); Tatjana Kostic, Niederrohrdorf (CH)

(73) Assignee: ABB Research Ltd, Zurich (CH)

( * ) Notice: Subject to any disclaimer, the term of this patent is extended or adjusted under 35 U.S.C. 154(b) by 522 days.

(21) Appl. No.: 11/984,040

(22) Filed: Nov. 13, 2007

(65) Prior Publication Data

US 2008/0133613 A1 Jun. 5, 2008

Related U.S. Application Data

(63) Continuation of application No. PCT/CH2005/000268, filed on May 13, 2005.

(51) Int. Cl.
*G06F 17/30* (2006.01)
(52) U.S. Cl. ....................................... 707/656
(58) Field of Classification Search .................. 707/201, 707/656, 659
See application file for complete search history.

(56) References Cited

U.S. PATENT DOCUMENTS

| | | | |
|---|---|---|---|
| 5,991,536 A | 11/1999 | Brodsky et al. | |
| 6,339,840 B1 * | 1/2002 | Kothari et al. | 717/149 |
| 6,363,435 B1 | 3/2002 | Fernando et al. | |
| 6,470,342 B1 * | 10/2002 | Gondi et al. | 707/10 |
| 6,973,473 B1 * | 12/2005 | Novaes et al. | 709/201 |
| 2003/0097381 A1 * | 5/2003 | Detweiler et al. | 707/201 |
| 2005/0010931 A1 | 1/2005 | Langkafel et al. | |
| 2005/0022171 A1 | 1/2005 | Langkafel et al. | |
| 2005/0083642 A1 * | 4/2005 | Senpuku et al. | 361/681 |

OTHER PUBLICATIONS

PCT/ISA/210 and PCT/IPEA/409 Svensson et al., Data Consistency in a Heterogeneous IT Landscape: A Service Oriented Architecture Approach, XP1073028, 2004.

* cited by examiner

*Primary Examiner* — John Breene
*Assistant Examiner* — Dennis Myint
(74) *Attorney, Agent, or Firm* — Buchanan Ingersoll & Rooney PC

(57) ABSTRACT

The present disclosure facilitates the interoperability between different local applications. Related local data objects are referenced via global objects or reference containers within a global data model or a global address space of an integration solution. The present disclosure assumes that the integration solution is per default in a consistent state, e.g., an engineered or initially configured global address space is regarded as consistent, and all software components that operate within this space assume that the information they access is valid and likewise consistent. The local applications are the only components that can interact with the global address space and introduce invalidations, they are continuously monitored for changes. Invalidation and subsequent synchronization or restoration of consistency is performed upon a particular triggering event related to a change in a local application object (such as an insertion or removal of an object or a modification of an attribute thereof) or related to a changing application or adapter status (component shutdown/startup).

12 Claims, 2 Drawing Sheets

US 7,958,092 B2

MAINTAINING DATA CONSISTENCY BETWEEN INTEGRATED APPLICATIONS

RELATED APPLICATIONS

This application claims priority as a continuation application under 35 U.S.C. §120 to PCT/CH2005/000268 filed as an International Application on 13 May 2005 designating the U.S., the entire contents of which are hereby incorporated by reference in their entireties.

TECHNICAL FIELD

The disclosure relates to the field of industrial Information Technology (IT) as utilized in particular in process or utility automation. It departs from a method of maintaining data consistency or integrity among integrated local applications.

BACKGROUND INFORMATION

Power utilities are concerned with the generation, transmission and distribution of electrical power. The physical assets or devices used in power utilities have specific properties associated with them. Examples of such physical assets include stations, lines, transformers or breakers. The properties include, for instance, a nominal primary voltage or a momentary tap position of a transformer. For maintaining, operating, controlling and/or monitoring these physical assets, various local applications and corresponding Information Technology (IT) systems are employed. The term "local" in the context of the present disclosure does not relate to a geographical property, but refers to the fact that these applications are concerned only with certain aspects of the physical assets. Examples of such local applications include a Computerized Maintenance Management System (CMMS), a Supervisory Control And Data Acquisition (SCADA), a Geographic Information System (GIS), an Enterprise Resource Planning System (ERP) and the like. In the context of power utilities, CMMS comprises e.g. active and archived work reports as well as new work orders, and allows to dispatch maintenance crews. SCADA comprises an electrical view on the assets of the electrical network in order to operate breakers and switches, and monitor voltages, currents or capacity limits, whereas GIS is used to optimize maintenance operations through the spatial view on the assets.

The physical assets are modeled in the various local applications as objects carrying specific attributes with them. The physical assets are referred to in a number of different ways due to the fact that each local application is responsible for different aspects of managing the physical asset. In addition, each of the corresponding IT systems allows modification of the underlying data sets, both for an initial setup and continuous updates, i.e. attributes can be changed and objects can be inserted or deleted at runtime, either automatically or initiated through operators and utility personnel. Such modifications on the system side reflect the frequent modifications of e.g. the electrical network of a power utility through commissioning or disposal of physical assets, which subsequently imply changes in one or more of the local application's data sets. The foregoing may result in inconsistent data, e.g. an attribute having different values in the control and maintenance system, or a new object being inserted in the planning system but still missing in the maintenance system. This inconsistency is a consequence of insufficient coordination and automation of work processes.

As the physical assets concerned by the abovementioned modifications share a certain extent of information with several local applications or corresponding IT systems, any inconsistency should be resolved and the data concerned should be updated across the IT systems in order to ensure information consistency among the local applications. However, on the IT side, navigation between, synchronization of and consolidated access to information stored in the various systems in operation is complex and maintenance efforts are generally huge.

All IT systems work on either real-time or standard database products. A synchronization or replication of all these databases triggered by the faintest change in one single attribute obviously is computationally expensive. In addition, synchronizing real-time database applications such as SCADA and standard database applications may not be feasible at all. Furthermore, a direct synchronization on the database level is not suited for utility applications, since applications usually perform a multitude of security and sanity checks in order to ensure that modifications on objects are possible and allowed with the current configuration. Therefore, the only suitable method for accessing those local applications' data sets is by accessing the information through the Application Program Interface (API) provided by the corresponding IT system.

In addition, a hardware or software component of one of the IT systems might fail during operation. For instance, in case of a communication failure to a local application, changes being made inside this local application go by unnoticed by the other local applications. In order to restore consistency, components are deployed in a redundant way, such that failure of hardware or software components can be overcome. However, systematic errors cannot be resolved through this approach. On the other hand, an alternative approach to regularly poll all local applications for changes puts a heavy load on all communication channels and is not feasible in large utilities with millions of assets.

SUMMARY

The disclosure is directed to facilitating interoperability between different local applications, such as in utility automation, by providing faster and cheaper synchronization or consistency maintenance of related objects and attributes in the databases of the corresponding IT systems. A method of, and an arrangement or computer program for, maintaining data consistency among integrated local applications are disclosed. The computer program is stored on a computer readable medium. Related local data objects of different local applications are referenced via global objects or reference containers within a global data model or a global address space of an integration solution. The present disclosure, instead of assuming that the integration solution is always in an inconsistent state due to changing objects and attributes and by therefore implementing functionality that continuously queries the global address space, assumes that the integration solution is per default in a consistent state. In other words, an engineered or initially configured global address space is regarded as consistent, and all software components that operate within this space assume that the information they access is valid and likewise consistent.

The local applications being the only components that can interact with the global address space and introduce invalidations, they, or corresponding application adapters provided for data translation, respectively, are continuously monitored for changes. Invalidation and subsequent synchronization or restoration of consistency is performed upon a particular triggering event related to a change in a local application object (such as an insertion or removal of an object or a modification of an attribute thereof or related to a changing application or adapter status (component shutdown/startup). The concept of global objects restricts the number of synchronization actions following a triggering event to the strict minimum, and thus significantly reduces the time and computational efforts until restoration of consistency. The presented solution is also more reliable—accessing a reference container means that this container is in a consistent state, as long as it is not explicitly invalidated.

As the data can be accessed through the Application Program Interface (API) of the local applications, the present disclosure is particularly useful for power utilities, where security checks prohibit data access on database level, and where the large number of physical assets does prohibit querying continuously each and every local object of any local application for possible changes.

BRIEF DESCRIPTION OF THE DRAWINGS

The subject matter of the disclosure will be explained in more detail in the following text with reference to preferred exemplary embodiments that are illustrated in the attached drawings, of which.

The reference symbols used in the drawings, and their meanings, are listed in summary form in the list of reference symbols. In principle, identical parts are provided with the same reference symbols in the figures.

DETAILED DESCRIPTION

To overcome the challenges of interoperability between the local applications, so-called integration solutions are being developed. An exemplary way of interacting between the local applications, or their corresponding local data models, respectively, makes use of a global data model such as the Common Information Model (CIM) according to the standard IEC 61970 in the case of power utilities. With this concept, point-to-point connections between the local applications are avoided, since all local data or information models only "translate" into, and communicate via, the global data or information model. Thus, adding a new local application requires developing an adapter or interface between the corresponding new local data model and one single global data model, instead of developing translators for all other local data models.

The real-world physical assets or devices, such as the transformers, breakers or stations of a utility, are modeled in a local application as local object instances, whereas properties of the assets, such as a nominal primary voltage or a momentary tap position, are represented as attributes of an object. Each local object instance is of a certain local object type, which defines the attributes that are exposed by the objects and accessible via the application's API. For instance, two transformers of the same physical type are modeled as two local object instances of the same object type in one particular local application. Since all local applications refer to the same physical assets, the concept of "reference containers" or "global objects" is introduced as a means to group associations between local object instances in the local applications which logically share some kind of relationship. This relationship generally is the same physical asset modeled, but in fact may be defined freely and thus correspond e.g. a the navigation from the GIS object 'pole' to the SCADA object 'line'. In an initial or set-up phase, the relationships between the objects from the different IT systems are engineered and objects from different local applications are grouped into reference containers.

Figure 1:
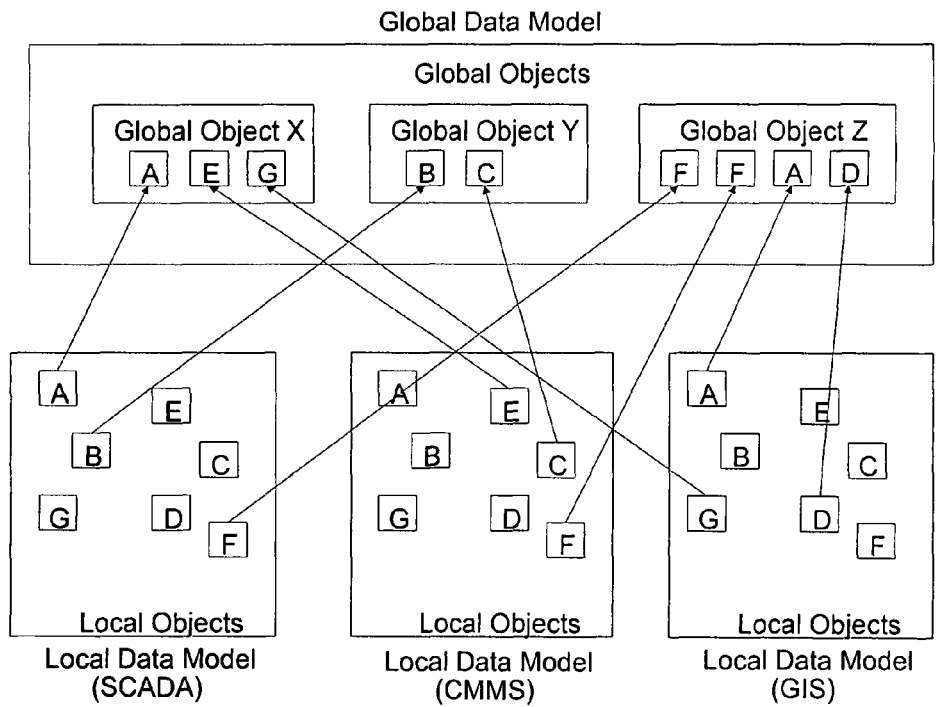
FIG. 1 schematically shows three reference containers grouping references to local objects.

In FIG. 1, three reference containers, identified by global identifiers X, Y, Z, are depicted as global objects within the global data model. Local object instances A to F within the local data models corresponding to the three applications SCADA, CMMS and GIS, are shown as well. The references to the local object instances are depicted as arrows and held in the reference containers as meta-information comprising a local identifier A, B, C, . . . in order to access the local object in the local application, and an application identifier which allows to direct any requests related to that object to the corresponding application adapter. The reference container Z contains references to two local objects A, D in the same GIS application. Thus it is possible to vary the modeling granularity between the different applications. The global identifiers allow accessing the relationship from applications, as well as it allows to bind the reference containers to a structure hierarchy.

Figure 2:
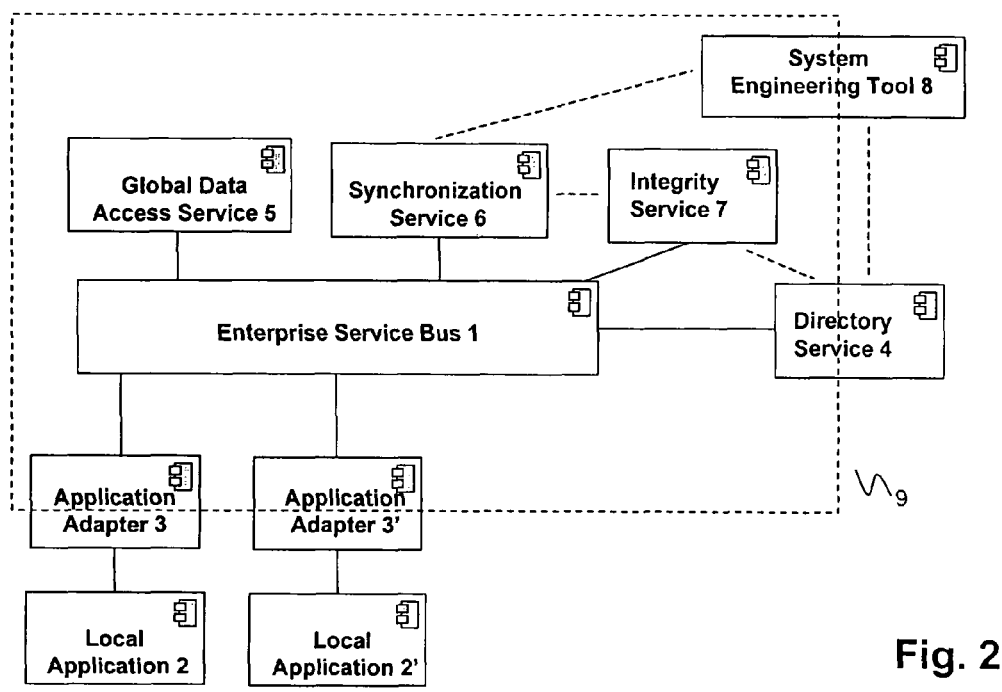
FIG. 2 shows the main exemplary components of the IT architecture.

FIG. 2 depicts an integration architecture overview comprising the following exemplary main building blocks: an enterprise service or message bus 1 connecting subscribers such as various local applications 2, 2' via their corresponding application adapters 3, 3', a directory service 4, a global data access service 5, a synchronization service 6, an integrity service 7 and a system engineering tool 8. The dashed borderline 9 indicates the border between local data models as employed by the local applications 2, 2' and the global data model as utilized by the global data access 5 or synchronization services 6. Adapters 3, 3', directory service 4 and engineering tool 8 reside on the borderline 9, i.e. they have knowledge of both local and global data models.

Acting as a central intermediary, the message bus 1 provides a reliable and secure communication backbone. All messages expressed in the global data model are delivered through this message bus 1.

Adapters 3, 3' act as a link between the application program interface (API) of a local application 2, 2' and the message bus 1. They retrieve from, and send data to, the applications and translate or mediate between the global and the local data models. A translation is generally performed on a type-basis and involves all the attributes of an object type. According to the disclosure, the adapters can also publish notifications when data changes occur in the applications as detailed further below.

The adapters 3, 3' utilize the directory service 4 in order to execute requests for data model translations. The directory service 4 stores and provides the mapping information that the adapters 3, 3' require to translate between data fields of the global and local data models, e.g. the indication which data field from the local data model is to be mapped to which data field from the global data model, and including a rule for converting numerical attribute values. The mapping information contains information such as associations between local (A, B, C) and global identifiers (X, Y, Z). The content of the directory service 4 can be altered through the synchronization service 6 at runtime as further discussed below, or offline through the engineering tool 8. In addition, the directory service 4 stores all the local object instances of the local applications 2, 2' in an object instance base, including those that are not assigned to any of the reference containers.

The global data access 5 manages all information requests directed to the local applications through the global data model. It assembles the information pieces into a complete set which is made available to the user.

In order to resolve data inconsistency due to insufficient coordination and automation of work processes that involve modification of asset properties such as attribute values, users and applications interact with the synchronization service 6 that helps to manage the workflow, from the point an inconsistency is detected until the applications are consistent again.

The integrity service 7 is a software component, which is initiated e.g. upon "adapter live" events, and itself interacts with other components of the integration solution (Synchronization Service 6, Directory Service 4, Global Data Access Service 5) in order to restore a consistent state in the global address space as detailed further below.

An engineering tool 8 is typically used to configure the relationships among objects before the solution is deployed. The definition of the relationships is done in an offline process with the engineering tool, and is deployed to a runtime component such as directory service 4.

Each of the local applications comprises a "local address space" in which the accessible local objects are identified, and in which the local object types of the local data model are defined by the respective local application. In the notation of the present disclosure, the proposed integration solution in turn comprises a "global address space" in which the reference containers are identified, and in which the global object types of the global data model are derived from a standard like CIM.

The adapters are the only software components of the integration solution that interact between the local and global address spaces by translating information represented in a local data model or format into the global data model, based on mapping information retrieved from the directory service 4. All other software components, such as the synchronization service 6, do only exchange information expressed in the global data model and have no notion from which local application or local address space an information is originating from.

The global address space is initially configured via the engineering tool 8, through which the relationships of the local object instances in the various local applications as well as the mapping of the attributes are defined. Said relationships as part of the reference containers and said mapping information are then deployed to the directory service 4.

Instead of assuming that the integration solution is always in an inconsistent state due to changing objects and attributes, and by therefore implementing functionality which continuously queries the configuration and updates it, the present disclosure assumes that the integration solution, i.e. the global address space, is per default in a consistent state. This is enabled by the fact that the known local applications 2, 2' are the only components that can interact with the global address space and introduce invalidations to the configuration. Hence, the former are continuously monitored or listened to, and a synchronization process is engaged only upon the occurrence of changes in the local address spaces that are duly reported by the application adapters 3, 3' to the integrity service 7. Accordingly, every adapter, or an equivalent software component that operates at a local/global boundary, has to be able to tell about changes in its supervised or controlled local address space, during operation as well as during startup/shutdown of the respective adapter or component.

The integrity service 7 monitors for triggering events sent by an adapter and indicative of a startup/shutdown or a communication failure concerning the adapter, or indicative of a change in an object, and then requests further information from the adapter. If the adapter is able to locate the changes by telling which individual object has been inserted or removed, or of which individual object a specific attribute has been modified, then only those reference containers that refer to said individual object are invalidated. Otherwise each and every reference container referring to an object from the local address space is invalidated. In any case, the integrity service 7 notifies the directory service 4 about the reference containers that need to be invalidated until consistency is restored by the synchronization service 6.

The proposed concept of global objects or reference containers restricts the number of synchronization actions to the strict minimum, as only a subset of the configuration has to be validated, and thus significantly reduces the time and computational efforts until restoration of consistency. The presented solution is also more reliable—accessing a reference container means that this container is in a consistent state, as long as it is not explicitly invalidated.

Figure 3:
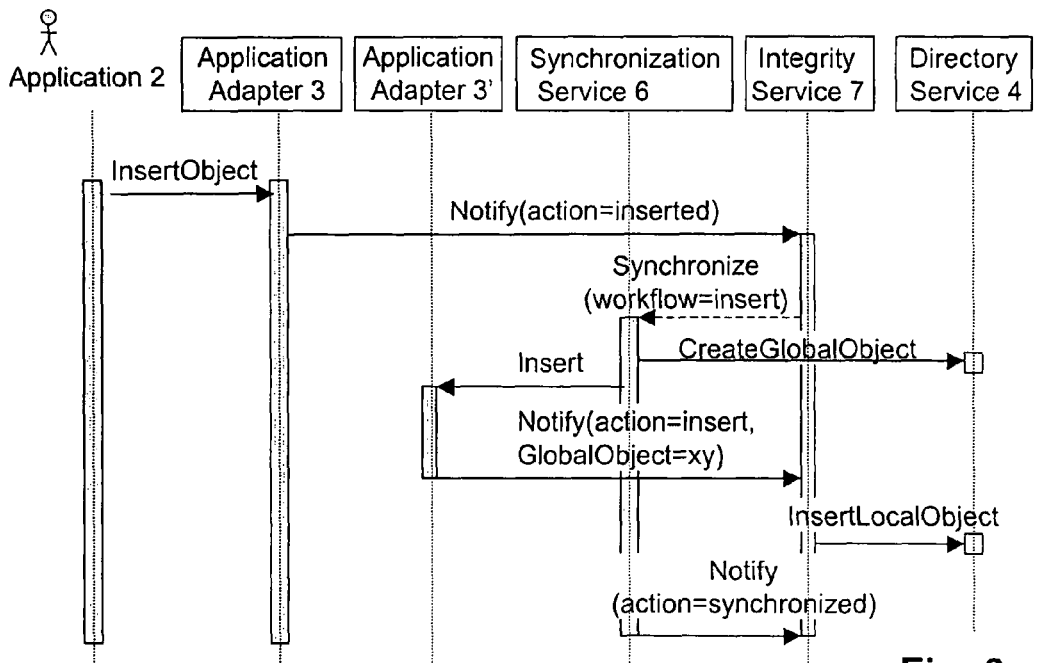
FIG. 3 shows an update procedure initiated by an object inserted in a local application.
Figure 4:
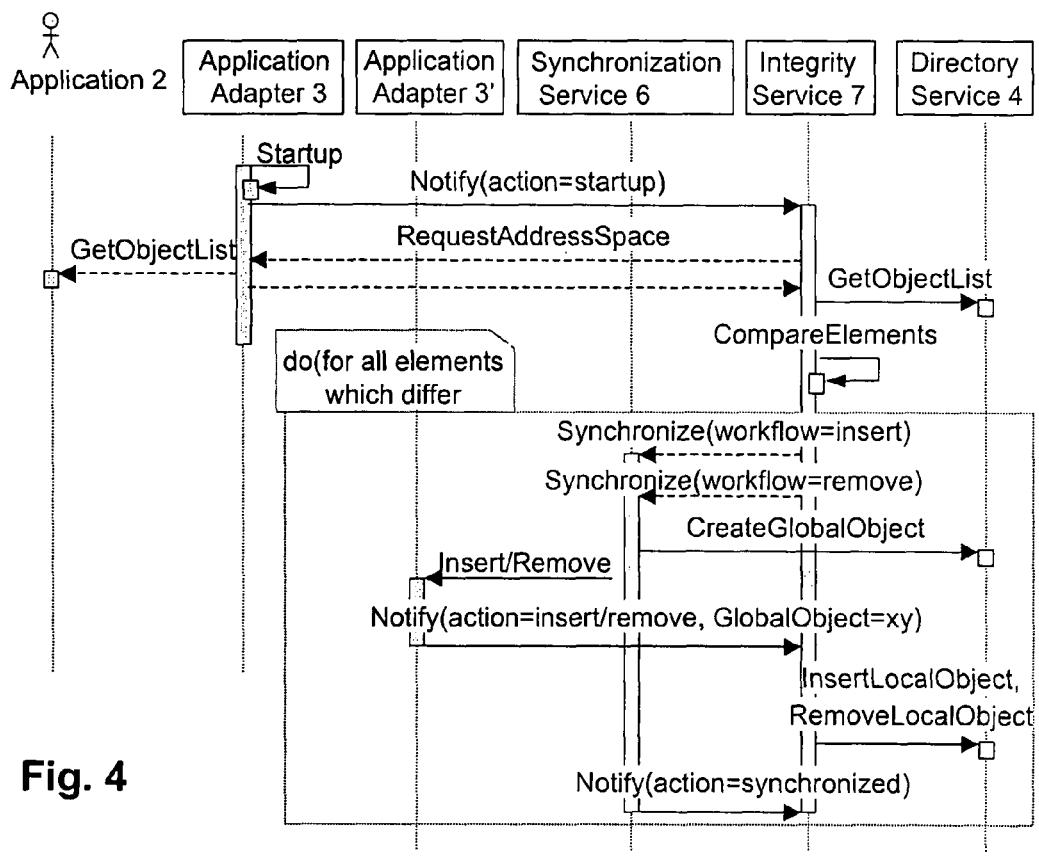
FIG. 4 shows an update procedure following an application adapter failure.

The above inventive principle will be explained in the following in conjunction with two exemplary integration solutions as illustrated in FIG. 3 and FIG. 4.

FIG. 3 depicts how an update is processed following the detection, by application adapter 3, of an exemplary change in the form of an object instance (A) inserted into local application 2. The adapter detects such changes via an event-based interface of the API of the corresponding underlying local application that exposes or indicates the aforementioned change as an event. Otherwise, If no event-based interface is exposed by the local applications, inserted or removed objects may be identified via a comparison of the local address space with a previous snapshot of the local address space comprising all local object identifiers in an object instance base of the directory service. A corresponding notification is sent to the integrity service 7, which in turn causes the synchronization service 6 to create a reference container (Z) or a global object of a type corresponding to the local object type of the inserted object (A). The synchronization service 6 eventually mandates application adapter 3' to make application 2' insert a local object (B) of the local object type corresponding to the aforementioned global object type. The execution of this task is signaled back to the integrity service 7. Following this, the directory service 4 is notified and the newly created reference container (Z) completed. Alternatively, the procedure may require manual interaction or a follow-up through the engineering tool 8 to decide whether the newly inserted (A) object will be assigned to an existing reference container (Y) instead of creating a new reference container (Z). Finally, synchronization service 6 reports completion of the update task to the integrity service 7, and the global address space is flagged as consistent.

An exemplary notification, to be transmitted via email from the adapter 3 for application CMMS to the integrity service 7, might look like indicated below. In this case, the adapter 3 was notified by the local application about an inserted local object with a particular local identifier, based on which the GobalObjectIdentifier indicated was subsequently obtained from the directory service 4.

```
<?xml version="1.0" encoding="utf-8"?>
<soap:Envelope xmlns:xsi="http://www.w3.org/2001/XMLSchema-instance"
    xmlns:xsd="http://www.w3.org/2001/XMLSchema"
    xmlns:soap="http://schemas.xmlsoap.org/soap/envelope/">
    <soap:Body>
```

```
<Notification xmlns="http://www.abb.com/">
    <Action>insertedObject</Action>
    <Initiator>CMMS-1.0 Adapter (SAP)</Initiator>
    <GlobalObjectIdentifier>{46ae-9705-8ba497010d}
    </GlobalObjectIdentifier>
</Notification>
</soap:Body>
</soap:Envelope>
```

FIG. 4 depicts an update process following a failure or temporary time-out of application adapter 3 or application 2 during which e.g. notifications to or from the integrity or synchronization service were not processed by the local application. Objects inserted in the local application 2 during an inaccessibility of adapter 3 are identified through a comparison of the object instances at the time the application adapter 3 resumes service and the object instance base which has been stored with the directory service 4 and which represents an acknowledged "consistent" state. If changes in the local address space in terms of deleted and inserted objects are thus identified, the subsequent synchronization time can be reduced considerably. In detail, the adapter 3 reads its present instance list following a request by the integrity service 7 and hands it over to the integrity service 7, which compares this list with the object instance base stored in directory service 4. If there are new objects identified which are not stored in the directory service 4, the integrity service 7 triggers an update or object-insertion procedure similar to the one outlined in the case of FIG. 3. Alternatively, if the abovementioned identification process is not available, it is assumed that all configured instances resulting from this local application are "invalid". The update procedure is carried out by the synchronization service 6 and depicted within the dotted rectangle 10 in FIG. 4. Once the integrity service 7 has initiated all workflows, the new instance list is finally copied to the directory service 4 to replace the previous one for that local application as a new object instance base.

Albeit somewhat more complex due to the fact that all attributes of an object type have to be stored in the object instance base in directory service 4, a change in the form of a modified attribute is treated similarly to the way outlined above. If the triggering change consists in a modified attribute value, a corresponding notification is sent to the integrity service 7 and the directory service 4 is notified instantly about all reference containers that need to be invalidated or flagged as inconsistent. Again, this initial notification is then propagated to other local applications 2' in order to re-establish a consistent state.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

| | |
|---|---|
| 1 | message bus |
| 2, 2' | local applications |
| 3, 3' | application adapters |
| 4 | directory service |
| 5 | global data access service |
| 6 | synchronization service |
| 7 | integrity service |
| 8 | system engineering tool |
| 9 | border between local and global data models |

What is claimed is:

1. A method of maintaining data consistency among different integrated local applications of an automation solution for a utility, the utility comprising a number of physical assets, the automation solution comprising:
   a global data access service including global objects within a global data model; and
   the different integrated local applications,
   wherein each of the different integrated local applications is within a corresponding local data model and includes respective local objects,
   wherein a first local application and a second local application having respective first local objects and second local objects are included among the different integrated local applications,
   wherein at least some of the local objects of the integrated local applications are related,
   wherein the first local objects of the first local application are related to the second local objects of the second local application,
   wherein related local objects among the local objects of the different integrated local applications are referenced via the global objects within the global data model,
   wherein the automation solution comprises, for each of the integrated local applications, a corresponding adapter for translating between the local data model of the local application and the global data model, and
   wherein the method comprises:
   in the absence of any change to a local object among the local objects or to a status of a local application among the local applications or the corresponding adapter, assuming the local objects to be consistently representing physical assets of the utility;
   in the case of a change to a local object among the local objects or to a status of a local application among the local applications or the corresponding adapter, invalidating any global object among the global objects referencing to said local object or to all the local objects of said local application; and
   for each of the invalidated global objects, restoring data consistency among all referenced local objects.

2. The method according to claim 1, wherein the change to the local object among the local applications comprises inserting or deleting the object, or modifying an attribute of the object, and
   wherein the method comprises detecting said change, via an interface of said local application, by the corresponding adapter.

3. The method according to claim 2, comprising:
   reporting the change by the adapter to an integrity service;
   notifying a directory service for the invalidating of the global objects to be invalidated;
   notifying a synchronization service for the restoring of the data consistency among the referenced local objects.

4. The method according to claim 1, wherein the change to the status of the local application among the local applications or the corresponding adapter comprises a startup or shutdown of the local application or the adapter, and wherein the method comprises comparing, by the corresponding adapter, all local objects of said local application with an object instance base.

5. The method according to claim 4, comprising:
reporting the change by the adapter to an integrity service;
notifying a directory service for the invalidating of the global objects to be invalidated; and
notifying a synchronization service for the restoring of the data consistency among the referenced local objects.

6. The method according to claim 1, wherein a first local object among the first local objects of the first local application and a second local object among the second local objects of the second local application model the same physical asset of the utility.

7. The method according to claim 1, wherein the utility is a power utility comprising the physical assets, and
wherein the physical assets comprise at least one of transformers, breakers, and stations of the power utility.

8. The method according to claim 1, wherein the global objects within the global data model are initially configured by an engineering tool.

9. A computer readable medium having a computer program stored thereon, that, when executed by a computer, causes the computer to perform the method according to claim 1.

10. A system for maintaining data consistency, comprising:
different integrated local applications of an automation solution for a utility, the utility having a number of physical assets; and
a global data access service including global objects within a global data model,
wherein each of the different integrated local applications is within a corresponding local data model and includes respective local objects,
wherein a first local application and a second local application having respective first local objects and second local objects are included among the different integrated local applications,
wherein at least some of the local objects of the integrated local applications are related,
wherein the first local objects of the first local application are related to the second local objects of the second local application,
wherein related local objects among the local objects of the different integrated local applications are referenced via the global objects within the global data model, and
wherein the system further comprises:
for each of the integrated local applications, a corresponding adapter for translating between the local data model of the local application and the global data model; and
a processor configured to:
in the absence of any change to a local object among the local objects or to a status of a local application among the local applications or the corresponding adapter, assume the local objects to be consistently representing physical assets of the utility,
in the case of a change to a local object among the local objects or to a status of a local application among the local applications or the corresponding adapter, invalidate any global object among the global objects referencing to said local object or to all the local objects of said local application, and
for each of the invalidated global objects, restore data consistency among all referenced local objects.

11. The system according to claim 10 wherein the utility is a power utility comprising the physical assets, and
wherein the physical assets comprise at least one of transformers, breakers, and stations of the power utility.

12. A method of maintaining data consistency among different integrated local applications of an automation solution for a utility, the utility comprising a number of physical assets, the automation solution comprising:
a global data access service including global objects within a global data model; and
the different integrated local applications,
wherein each of the different integrated local applications is within a corresponding local data model and includes respective local objects,
wherein a first local application and a second local application having respective first local objects and second local objects are included among the different integrated local applications,
wherein at least some of the local objects of the integrated local applications are related,
wherein the first local objects of the first local application are related to the second local objects of the second local application,
wherein related local objects among the local objects of the different integrated local applications are referenced via the global objects within the global data model,
wherein the automation solution comprises, for each of the integrated local applications, a corresponding adapter for translating between the local data model of the local application and the global data model, and
wherein the method comprises:
in the case of a startup or shutdown of a local application among the local applications or the corresponding adapter, comparing, by the corresponding adapter, all local objects of said local application with an object instance base,
invalidating any global object among the global objects referencing to a local object of said local application that was found, by said comparison, to differ; and
for each of the invalidated global objects, restoring data consistency among all referenced local objects.

* * * * *